(12) United States Patent
Eagleton et al.

(10) Patent No.: US 10,061,980 B2
(45) Date of Patent: Aug. 28, 2018

(54) DIGITAL VERIFICATION OF MODIFIED DOCUMENTS

(71) Applicant: Accenture Global Services Limited, Dublin (IE)

(72) Inventors: Michael Eagleton, Flintshire (GB); Clara Fletcher, London (GB)

(73) Assignee: ACCENTURE GLOBAL SERVICES LIMITED, Dublin (IE)

( * ) Notice: Subject to any disclaimer, the term of this patent is extended or adjusted under 35 U.S.C. 154(b) by 104 days.

(21) Appl. No.: 14/831,095

(22) Filed: Aug. 20, 2015

(65) Prior Publication Data

US 2017/0053164 A1 Feb. 23, 2017

(51) Int. Cl.
| | |
|---|---|
| *G06K 9/00* | (2006.01) |
| *G06K 9/20* | (2006.01) |
| *H04N 1/00* | (2006.01) |
| *H04N 1/387* | (2006.01) |
| *H04N 1/32* | (2006.01) |

(52) U.S. Cl.
CPC ..... *G06K 9/00456* (2013.01); *G06K 9/00483* (2013.01); *G06K 9/2063* (2013.01); *H04N 1/00843* (2013.01); *H04N 1/32251* (2013.01); *H04N 1/32267* (2013.01); *H04N 1/32309* (2013.01); *H04N 1/387* (2013.01); *H04N 2201/0081* (2013.01); *H04N 2201/3235* (2013.01); *H04N 2201/3245* (2013.01)

(58) Field of Classification Search
CPC .................. H04N 2201/3235; H04N 1/32251
See application file for complete search history.

(56) References Cited

U.S. PATENT DOCUMENTS

| | | | |
|---|---|---|---|
| 5,508,713 A | 4/1996 | Okouchi | |
| 5,611,630 A | 3/1997 | Dolan | |
| 5,829,895 A | 11/1998 | Hayashi | |
| 6,069,955 A | 5/2000 | Coppersmith et al. | |
| 6,313,787 B1 | 11/2001 | King et al. | |
| 6,314,518 B1 | 11/2001 | Linnartz | |
| 6,987,868 B1 | 1/2006 | Atarashi et al. | |
| 6,996,543 B1 | 2/2006 | Coppersmith et al. | |
| 7,283,630 B1 | 10/2007 | Doljack | |
| 7,364,074 B2 | 4/2008 | He et al. | |

(Continued)

FOREIGN PATENT DOCUMENTS

| | | |
|---|---|---|
| CN | 101561863 | 10/2009 |
| CN | 102270294 | 12/2011 |

(Continued)

OTHER PUBLICATIONS

Anonymous: Padding (Cryptography)—Wikipedia, the free encyclopedia, Sep. 28, 2012, Retrieved from the Internet on Nov. 24, 2014.

(Continued)

*Primary Examiner* — Oneal R Mistry
(74) *Attorney, Agent, or Firm* — Mannava & Kang, P.C.

(57) ABSTRACT

A document verification system may verify modification to a physical document through digital image processing. Imaging sensors capture images of a modified physical document. A digital image processing circuit measures pixel parameters for a plurality of regions of the digital images for comparison to a verification pattern to verify the document.

20 Claims, 4 Drawing Sheets

(56) References Cited

U.S. PATENT DOCUMENTS

| | | |
|---|---|---|
| 7,515,289 B2 | 4/2009 | Ohtuka |
| 8,666,841 B1 | 3/2014 | Claridge et al. |
| 9,369,287 B1 | 6/2016 | Sarvestani |
| 2001/0029483 A1 | 10/2001 | Schultz |
| 2002/0099843 A1 | 7/2002 | Fruchtman et al. |
| 2002/0127040 A1 | 9/2002 | Davies |
| 2003/0167235 A1 | 9/2003 | McKinley et al. |
| 2003/0182475 A1 | 9/2003 | Gimenez |
| 2003/0234718 A1 | 12/2003 | Fujisawa et al. |
| 2004/0112962 A1* | 6/2004 | Farrall ............... G06K 7/12 235/462.01 |
| 2005/0038756 A1 | 2/2005 | Nagel |
| 2005/0060171 A1 | 3/2005 | Molnar |
| 2005/0069171 A1 | 3/2005 | Rhoads |
| 2006/0026268 A1 | 2/2006 | Sanda |
| 2006/0059574 A1 | 3/2006 | Hayad et al. |
| 2006/0095289 A1 | 5/2006 | Bunning |
| 2007/0033108 A1 | 2/2007 | Luhr |
| 2007/0075168 A1 | 4/2007 | Rodriguez |
| 2007/0083649 A1 | 4/2007 | Zuzga et al. |
| 2007/0119918 A1 | 5/2007 | Hogg et al. |
| 2007/0175974 A1 | 8/2007 | Self et al. |
| 2007/0251989 A1 | 11/2007 | Grossman |
| 2007/0263912 A1 | 11/2007 | Blames et al. |
| 2008/0011841 A1 | 1/2008 | Self et al. |
| 2008/0074682 A1* | 3/2008 | Komatsubara ........ G06T 1/0071 358/1.1 |
| 2008/0110972 A1 | 5/2008 | Grossman |
| 2008/0163364 A1 | 7/2008 | Ferlitsch |
| 2008/0209512 A1 | 8/2008 | Silverbrook et al. |
| 2008/0244385 A1 | 10/2008 | Zukowski |
| 2008/0301011 A1 | 12/2008 | Monk |
| 2008/0312851 A1 | 12/2008 | Kagan et al. |
| 2009/0087076 A1* | 4/2009 | Jenrick ............... G07D 7/00 382/135 |
| 2009/0144199 A1 | 6/2009 | Oertel |
| 2009/0177470 A1 | 7/2009 | Beach et al. |
| 2009/0251724 A1 | 10/2009 | Nakajima |
| 2009/0257101 A1 | 10/2009 | Gurak |
| 2009/0283583 A1 | 11/2009 | Cowburn et al. |
| 2009/0286570 A1 | 11/2009 | Pierce, Jr. |
| 2009/0327008 A1 | 12/2009 | Collins et al. |
| 2010/0019026 A1 | 1/2010 | Hochfield et al. |
| 2010/0131592 A1 | 5/2010 | Zhang et al. |
| 2010/0179857 A1 | 7/2010 | Kalaboukis et al. |
| 2010/0266163 A1* | 10/2010 | Evevsky ............... G06K 9/036 382/112 |
| 2011/0093113 A1 | 4/2011 | Sager et al. |
| 2011/0107100 A1 | 5/2011 | Loeken |
| 2011/0125658 A1 | 5/2011 | Lanxner et al. |
| 2011/0133887 A1* | 6/2011 | Tian ............... G06K 9/2063 340/5.86 |
| 2011/0153512 A1 | 6/2011 | Peckover |
| 2011/0167010 A1 | 7/2011 | Soppera et al. |
| 2011/0200256 A1 | 8/2011 | Saubat et al. |
| 2011/0231316 A1 | 9/2011 | Carroll, III |
| 2012/0024956 A1 | 2/2012 | Chen |
| 2012/0106851 A1 | 5/2012 | Lei |
| 2012/0158541 A1 | 6/2012 | Ganti et al. |
| 2012/0215704 A1 | 8/2012 | Simpson et al. |
| 2012/0272221 A1 | 10/2012 | Pessoa et al. |
| 2013/0124614 A1 | 5/2013 | Yakoyama et al. |
| 2013/0170758 A1 | 7/2013 | Venkatesh |
| 2013/0173484 A1 | 7/2013 | Wesby |
| 2013/0290379 A1 | 10/2013 | Rhoads et al. |
| 2013/0297512 A1 | 11/2013 | Phillips et al. |
| 2014/0012799 A1 | 1/2014 | Eberlein et al. |
| 2014/0029073 A1 | 1/2014 | Wang et al. |
| 2014/0095398 A1 | 4/2014 | Lin |
| 2014/0132799 A1 | 5/2014 | Kim et al. |
| 2014/0214758 A1* | 7/2014 | Tripathi ............ G06F 17/30011 707/608 |
| 2015/0089615 A1 | 3/2015 | Krawczyk et al. |
| 2015/0302421 A1 | 10/2015 | Caton et al. |
| 2017/0039422 A1* | 2/2017 | Eschbach ............. G06K 9/2063 |
| 2017/0116475 A1* | 4/2017 | Nepomniachtchi .......................... G06K 9/00463 |

FOREIGN PATENT DOCUMENTS

| | | | |
|---|---|---|---|
| DE | 102006016830 | 10/2007 | |
| EP | 1575002 A1 * | 9/2005 | ............ G06T 7/001 |
| JP | 2000-232578 | 8/2000 | |
| WO | 97/25798 | 7/1997 | |
| WO | 2009/074866 | 6/2009 | |

OTHER PUBLICATIONS

Sameera Khan et al: "A Review on Offline Signature Recognition and Verification Techniques", International Journal of Advanced Research in Computer and Communication Engineering, Jun. 2, 2014, pp. 6879-6882.

Diaz-Santiago Sandra et al., "A cryptographic study of tokenization systems", International Journal of Information Security (IJIS), Heidelberg, DE, vol. 15, No. 4, Jan. 22, 2016, pp. 413-432.

Jiang C. et al., "Shadow identification", Proceedings of the Computer Society Conference on Computer Vision and Pattern Recognition. Jun. 15, 1992, pp. 606-612.

* cited by examiner

DIGITAL VERIFICATION OF MODIFIED DOCUMENTS

BACKGROUND

Document management systems are often used to store and manage large volumes of documents. Typically these systems digitize and store paper documents. For example, digitizing may include converting documents, e.g., paper documents, hard copies, etc., into a digital form. A scanner may be used to scan the document. Typically, optical scanners are used to capture an image of the document. For example, charged-coupled devices (CCDs) convert light to pixels to capture an electronic image of a document. Other types of scanners may be used. The scanners may be provided in many forms, including flatbed scanners, hand-held scanners, etc.

Once the document are in digital form, the digitized documents are stored and may be electronically managed. Electronic management may include providing remote access to documents, facilitating document searching, controlling access to documents, sharing documents, etc.

BRIEF DESCRIPTION OF DRAWINGS

Features of the present disclosure are illustrated by way of examples shown in the following figures. In the following figures, like numerals indicate like elements, in which.

DETAILED DESCRIPTION

Figure 1:
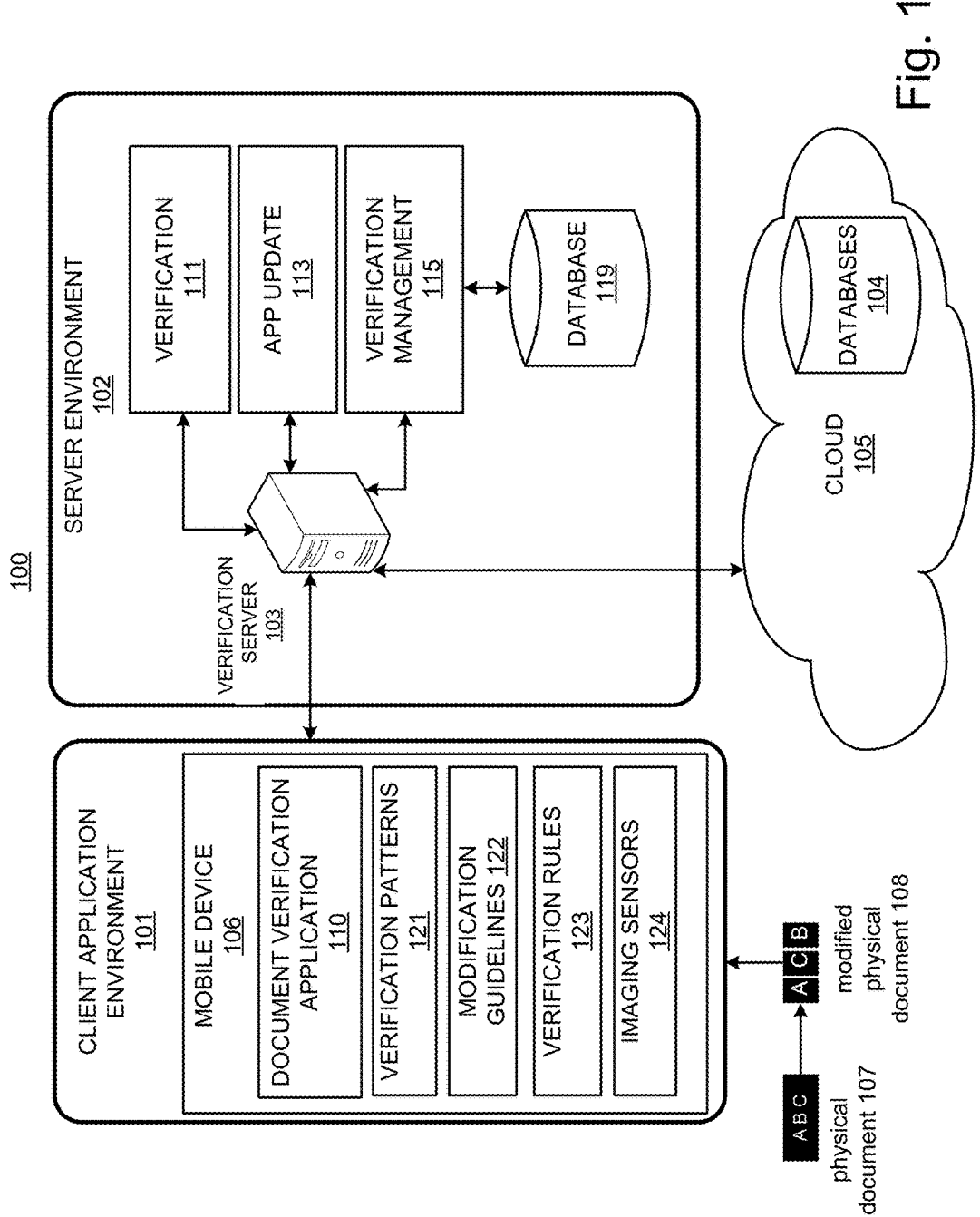
FIG. 1 illustrates a detailed architecture of a system, according to an example of the present disclosure.

For simplicity and illustrative purposes, the present disclosure is described by referring mainly to examples thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

According to embodiments and examples described herein, a document verification system can digitally verify modifications of a physical document through electronic pattern detection and analysis. The system can capture digital images of a modified physical document, and through pixel analysis of the digital images, determine whether the modified physical document conforms to a predetermined pattern indicative of a desired modification. Furthermore, through pixel analysis of the digital images, the system may determine whether the modified physical document is an authentic physical document. Randomized challenge requests may also be generated by the system to further verify the modified physical document or re-verify a document after a verification failure.

A physical document may include a paper document, e.g., hard copy, or some form of a document in a tangible form. A modified physical document refers to a physical document that is physically modified, such as by folding, tearing, cutting, marking, rearranging document sections, or some other action that causes a physical change to the document. The physical modification for example includes one or more physical modifications that are visually discernable by a human and can be captured by image sensors. The modification of the physical document for example is intended to destroy the physical document so it cannot be re-used. For example, for scenarios where a physical document is being replaced by a digital representation, the modifications may include destruction of the physical document so the physical document cannot be re-used. Some examples of these scenarios may include physical tickets or old paper currency being modified to prevent re-use. These physical documents may subsequently be represented or used digitally.

Systems and methods described herein may be used to verify that a document has been modified to according to predetermined guidelines. For example, a ticket to an event may be purchased and a physical ticket is provided to the purchaser. A copy of the physical ticket may be transferred to another person (i.e., transferee) for use by the transferee to attend the event instead of the purchaser. The transferee may want to verify that the original physical ticket will not be used. One or more of the systems and methods described herein may be used to digitally verify that the original ticket has been modified so that it cannot be used. In another example, one or more of the systems and methods described herein may be used to digitally verify that old currency to be taken out of circulation, such as old or damaged paper currency, has been properly modified so that it cannot be used. The modifications to the ticket or paper currency may be performed according to predetermined guidelines that may instruct a user how to modify the physical documents. The digital verification may verify that the documents are modified according to the predetermined guidelines. Systems and methods described herein can be implemented for any use where modification to a document is to be digitally verified, and verification of the modification may trigger other actions or operations.

In many instances, manual verification of a document modification is unreliable given the sophistication of counterfeiting techniques. Furthermore, in many instances, manual verification is simply not possible because the modified document is located remotely from a person, entity, etc., that is verifying the document modifications. Accordingly, document verification may be limited to verification through digital copies, and necessarily becomes a technical problem of how to digitally verify a modification to a physical document. Furthermore, the systems and methods described herein provide technical solutions in the digital domain. Additionally, specialized computers, rather than general purpose computers, for example, are incorporated in systems described herein for digital image filtering and pattern analysis that are performed for the document verification.

FIG. 1 illustrates a digital document verification system 100 according to an embodiment. The system 100 may include one or more of a client application environment 101 and a server environment 102.

The client application environment 101 may include but is not limited to a mobile device 106, such as, for example, a smart phone, a tablet or a portable personal computer (PC). Instead of a mobile device, a stationary computer may be used, such as a desktop PC.

The mobile device 106 may store and execute a document verification application 110 to verify modifications of a physical document, such as modified physical document 108. For example, physical document 107 is modified through a manual procedure to create modified physical document 108. The mobile device 106 may store one or more verification patterns 121 and one or more verification rules 123. The verification patterns 121 represent patterns of modifications, which may be for different types of documents. The verification rules 122 may specify which verification patterns to use. For example, the verification rules 122 may include rules for determining the document type based on document metadata determined from captured images of the modified physical document 108. The metadata may include characteristics of a physical document that identify its type, such as dimensions, color, thickness, markings, indicia, codes, etc. Based on a determined document type, a particular verification pattern is selected that corresponds to the type. The document verification patterns 122 are digitally identifiable patterns. In another example, a set of modification guidelines and a verification pattern are used for multiple document types or all documents. A document verification represents characteristics and a configuration of a physical modified document that has been correctly modified according to the modification guidelines, and the measured characteristics and configuration of a physical document, as determined from its digital images, are compared to the verification pattern to determine whether they match to verify the modified physical document.

The modification guidelines 122 may include instructions that specify how to modify a physical document so it conforms to a document verification pattern. For example, a set of modification guidelines of the guidelines 124 may include instructions for a user to modify physical document 107 to create modified physical document 108, such as by tearing, cutting, and/or folding the document 107 so it conforms to a verification pattern associated with guidelines. The guidelines may include step-by-step instruction on how to modify the physical document. Also, the set of modification guidelines may specify the number of digital images to capture and may specify different angles for capturing the digital images so dimensions, e.g., length, width, and depth or thickness, and other characteristics of the modified physical document 108 can be determined and compared to a document verification pattern to verify the document. Different modification guidelines 122 may correspond to different document types. The modification guidelines 122 may include instructions comprising text, images, video, audio, etc., that can be displayed, viewed, or listened to through the mobile device 106.

Imaging sensors 124 may include CMOS sensors or CCD sensors or any other suitable sensors for a digital camera, which may be used to capture digital images of the modified physical document 108. The imaging sensors convert light to pixels to capture electronic images of the modified physical document 108.

The server environment 102 may include verification server 103. The verification server 103 may include one or more servers that provide verification 111, application update operations 113 and verification management 115. For example, digital images of modified physical document 108 may be sent to the verification server 103 for verification rather than being performed at the mobile device 106. Verification 111 may be performed similarly to verification performed by the document verification application 110. Database 119 may store verification patterns and rules for verifying modifications to physical documents. The application update operations 113 may include updating document verification applications on remote devices, such as mobile device 106. Updates may include updates to the verification patterns 122, modification guidelines 122 and verification rules 123 and other application updates. Verification management 115 may include performing operations in response to verifying modifications, such as notifying external systems that documents are verified. The verification server 103 may communicate with further servers (not shown) and databases 104 in a cloud 105 to perform its operations or may be a server in the cloud 105. Document verification may be provided as a cloud service.

As described herein, operations, functions and elements of the system 100 may comprise machine readable instructions stored on a non-transitory computer readable medium and executable by a processor. In addition, or alternatively, hardware or a combination of machine readable instructions executable by a processor and other hardware may perform the operations and functions of the system 100.

Figure 2:
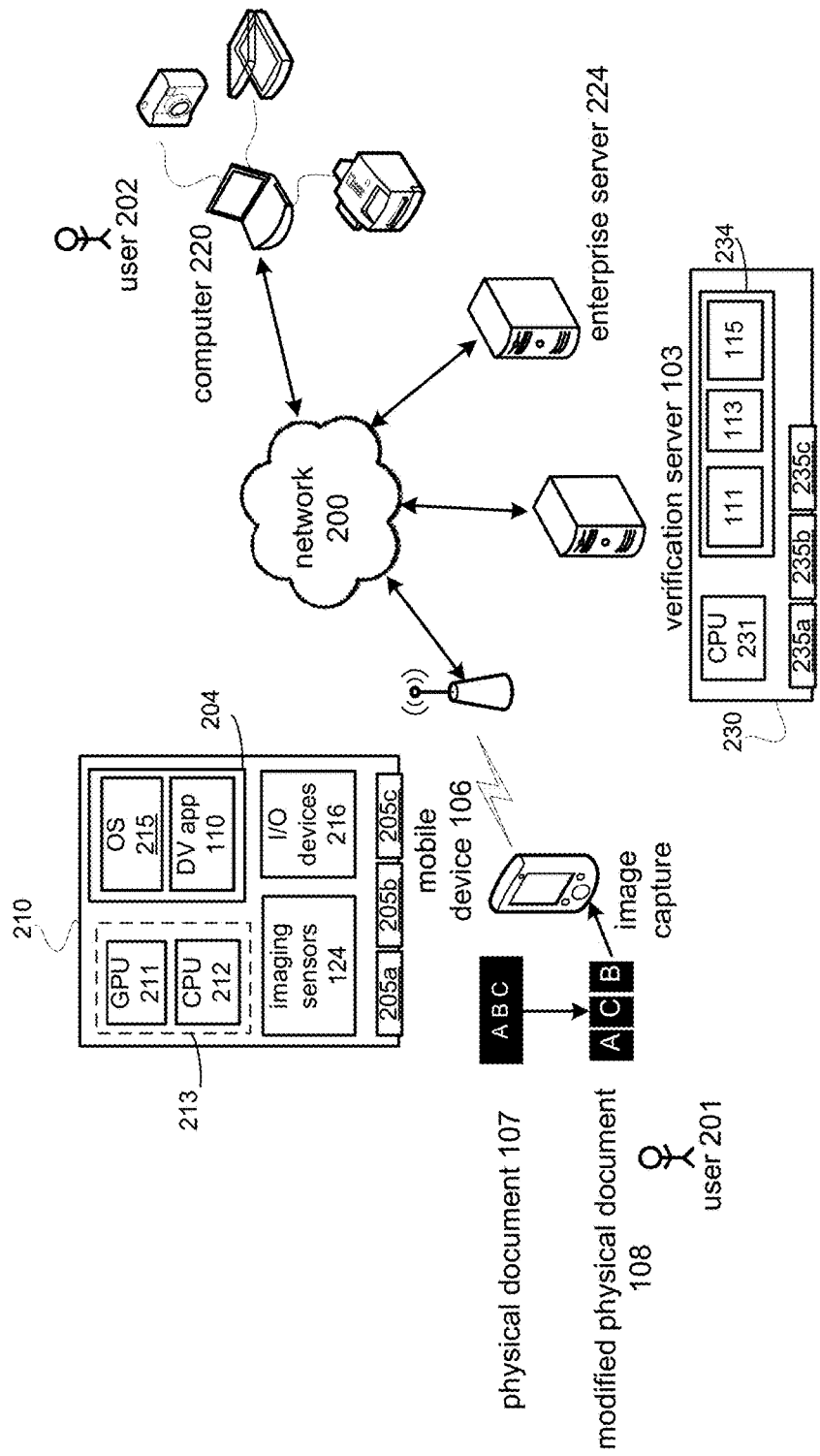
FIG. 2 illustrates details of the components of the system of FIG. 1, according to an example of the present disclosure.

FIG. 2 shows examples of the mobile device 106, verification server 103 and other computers that may be used in the system 100 which can be connected via network 200. The network 200 may include a wide area network (WAN), a local area network (LAN), public (e.g., Internet) or private networks, access network, wired or wireless network, or any suitable network. In one example, similar to as described with respect to FIG. 1, user 201 of mobile device 106 modifies document 107 to create modified physical document 108 according to a set of the modification guidelines 122. The mobile device 106 captures multiple digital images of the modified physical document 108 and compares parameters of the digital images to a corresponding verification pattern to determine whether there is a match. If there is a match, the modified physical document 108 is verified. A verification message may be sent to another computer to perform an action in response to the verification. For example, if the verification is for verifying a ticket is modified so it cannot be subsequently used, the verification may be sent to computer 220 and user 202 and/or enterprise server 224 to complete a transaction that is conditioned upon the verification. Another example of an action performed in response to the verification may include verifying paper currency is modified to be taken out of circulation and crediting a monetary value of the paper currency to the user's bank account. Any number or type of actions may be triggered in response to a verification. For example, a serial number of the paper currency, e.g., a dollar bill, is determined from the captured images. The serial number may be determined from captured images of the paper currency before and/or after modification of the paper currency. In an example, a user may input the serial number, and it is verified from an image or images of the modified paper currency. Due to the modification of the paper currency, the serial number may be located on different regions of the modified physical currency. A portion of the serial number is determined from each region containing the serial number, and each portion of the serial number may be appended according to a predetermined order (e.g., based on the region) to determine the full serial number. The serial number determined for example from the modified paper currency may be provided to a server, such as enterprise server 224, to credit the amount of the paper currency to the user's account if the modified paper currency is verified by the verification server 103.

In another example, a device may capture the images of a modified physical document and send the images to another computer for verification. For example, user 201 may capture images of the modified physical document 108 via mobile device 106, and the images are sent to the computer 220 or the verification server 103 for verification. For example, user 202 may request the digital images of the modified physical document 108, so verification can be performed on the computer 220, or verification is performed at a central location, such as verification server 103, and verification results, such as pass or fail are sent to the mobile device 106 and the computer 220. Also, various image capture devices 221 may be used to capture the digital images of the modified physical document, such as scanners, digital cameras, etc.

FIG. 2 also shows examples of hardware in computer platforms for mobile device 106 and verification server 103. Platform 210 includes components that may be used in mobile device 106. The mobile device 130*a* may include multiple interfaces 205, wired or wireless, for communicating with other devices. For example, interface 205*a* may be a cellular network interface, and 205*b* may be a Wi-Fi interface. Interface 205*c* may be a near-field communication (NFC) interface or a Bluetooth interface for short range communication.

The mobile device 106 includes a central processing unit (CPU) 212 and data storage 204. The CPU 212 for example is an integrated circuit. The CPU 212 may be a chipset with central processing unit and/or custom processing circuits, such as an application-specific integrated circuit (ASIC) or field-programmable gate array (FPGA). Graphics processing unit (GPU) 211 is an integrated circuit specialized for processing digital images, including the processing for the document verification described herein. The CPU 212 may run an operating system (OS) 215 and applications, including document verification application 110. A digital image processing circuit 213 may comprise one or more of the GPU 211, CPU 112 or other special processing circuits that can perform digital visual processing as described herein. The OS 215 and the applications are stored in data storage 204 which is a non-transitory computer readable medium. The mobile device 106 includes input/output (I/O) devices 216, such as keyboard, touch screen display, speaker, etc. The I/O devices 216 may provide audio, visual and/or tactile output to display or play modification guidelines, captured images, verification status, etc. Computer 220 may include a similar platform. Platform 230 includes components that may be used in the document verification server 103, such as CPU 312, data storage 234 including a non-transitory computer readable medium and interfaces 235. Functions or operations for verification 111, application update operations 113 and verification management 115 may be embodied as machine readable instructions executable by the CPU 312. The interfaces 235 may include a network interface, such as Ethernet, or other types of network interfaces, wired or wireless. The platforms 210 and 230 may include additional components not shown.

Figure 3:
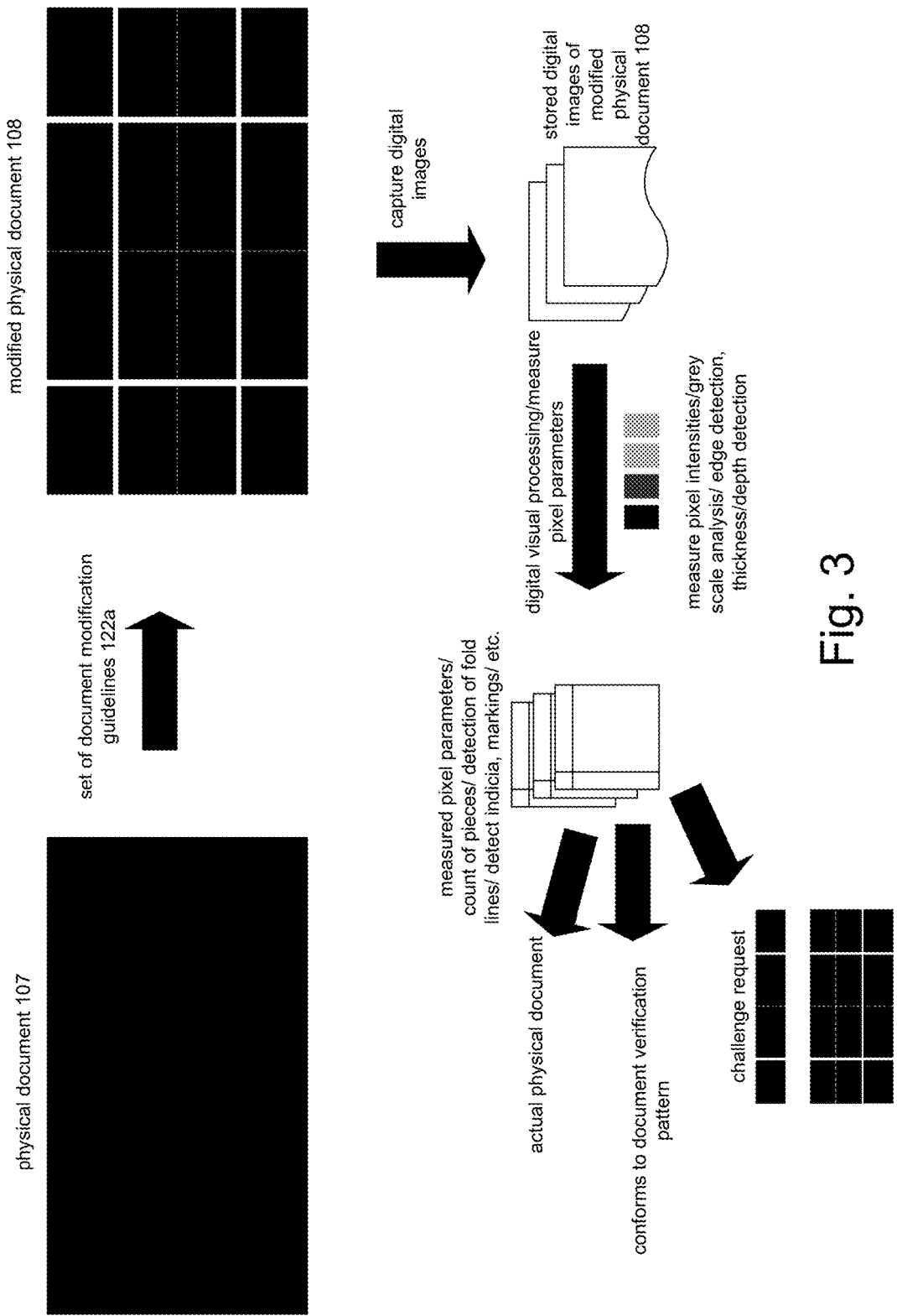
FIG. 3 illustrates a data flow diagram of operations of the system of FIG. 1, according to an example of the present disclosure.

FIG. 3 is a data flow diagram showing an example of document modification and verification which may be performed by the system 100. The document verification may be performed to verify document destruction, such as modifying the physical document so that it cannot be used for its desired purpose. A set of document modification guidelines 122*a* is applied to the physical document 107 to create the modified physical document 108. An example of steps for modifying the physical document 107 that may be provided in the guidelines 122*a* are as follows:

Step 1: Fold document in half across axis to create a rectangle (not diagonal to create a triangle);
Step 2: Fold document in half across other perpendicular axis to create a smaller rectangle;
Step 3: Tear complete document in half to produce two equal folded pieces;
Step 4: Place them on top of each other and make one more tear across the longest edge; and
Step 5: Unfold and lay out the pieces for photo-capture and verification.

The guidelines 122*a* may be displayed on a display of the mobile device 106 so the user can follow the steps and may be accompanied by an instructional video and/or images. The guidelines 122*a* are followed to create the modified physical document 108. For example, modified physical document 108 includes folds and is broken into nine separate pieces and arranged as shown in FIG. 3. Then images of the modified physical document 108 are captured for example using the imaging sensors 124 of the mobile device 106. The guidelines 122*a* may specify the number of images to capture, the angles to capture, special markings or indicia on the modified physical document 108 to capture, etc. The captured digital images are stored for example in the mobile device 106, and digital visual processing is performed on the stored digital images to measure pixel parameters and determine characteristics of the modified physical document 108. Digital video of the modified physical document 108 may also be captured and stored and analyzed.

Examples of characteristics determined from the digital visual processing may include determining number of pieces of the modified physical document 108, which is nine pieces in this example, measuring pixel intensities, identifying torn and machine-cut edges, detecting shadows and depth, detecting folds, determining color, identifying markings, dimensions, etc. In an example, the digital visual processing may include running the digital images through a filter, such as a grey-scale converter, and pixel intensities are measured to detect edges and folds. For example, drastic changes in pixel intensity in predetermined regions (e.g., locations of the modified physical document 108) may be indicative of folds, tears and cuts. Furthermore, from the edge detection, a determination of whether the edge is a straight line (e.g., machine-cut or scissor cut edge) or a jagged edge (tear or a fold). Shadows may also be identified by change in pixel intensities and can be used to detect depth or thickness of the modified physical document 108.

The measured pixel parameters and other determined characteristics may be stored and analyzed to determine whether the captured digital images are capturing an actual physical document rather than a fake or spoofed physical document. Also, the measured pixel parameters and the other determined characteristics are compared to a verification pattern of the verification patterns 121 to determine whether the modified physical document 108 conforms to the verification pattern.

To determine whether the captured digital images are capturing an actual physical document, the pixel analysis may determine whether any shadows are present around regions (near edges) of the modified physical document 108, and also thickness of the modified physical document 108 may be determined from images captured from different angles. Unscrupulous users may try to create fake images using software so they can re-use the physical document 107 after misrepresenting the physical document has been modified or destroyed. The digital visual processing can determine through the captured characteristics whether the captured document is a real document or a fake document.

If the document captured in the digital images is determined to be a real document rather than a fake document, then the system 100 may determine whether the measured pixel parameters and other determined characteristics match the verification pattern. For example, the determined dimensions are compared to dimensions specified for the verification pattern. The dimensions may be of the entire nine pieces as arranged according to the guidelines and/or the dimensions of each piece. The number of pieces should match the verification pattern. The location of fold lines, tears and straight edges should match the verification pattern. Markings, serial numbers, bar codes, color, etc., should match the verification pattern. If the pixel parameters and other characteristics determined from the digital visual processing match or conforms to the verification pattern, the system 100 determines the document is verified, i.e., the modified physical document 108 was modified from an original physical version according to guidelines 122*a*.

The system 100 may also generate a challenge request. If verification fails a reverification image may be requested. For example, the document verification application 110 requests a recapture of the 9-piece pattern image. Given some elapsed time the second images should be sufficiently different (in position and angles) from the previous ones to allow extended visual analysis. The document verification application 110 may randomly determine a change to the verification pattern and specify instructions to the user to re-create the layout of the pieces with the change. For example, as shown in FIG. 3, the modification in the challenge request is an increase in the spacing between the top row of pieces and the middle row of pieces. Other types of changes may be requested, such as additional folds or tears or additional changes to the layout. The verification process is performed again to determine whether the modified physical document with the change matches the verification pattern with the change. If the document is still not verified, alerts may be generated of the non-verified document.

Figure 4:
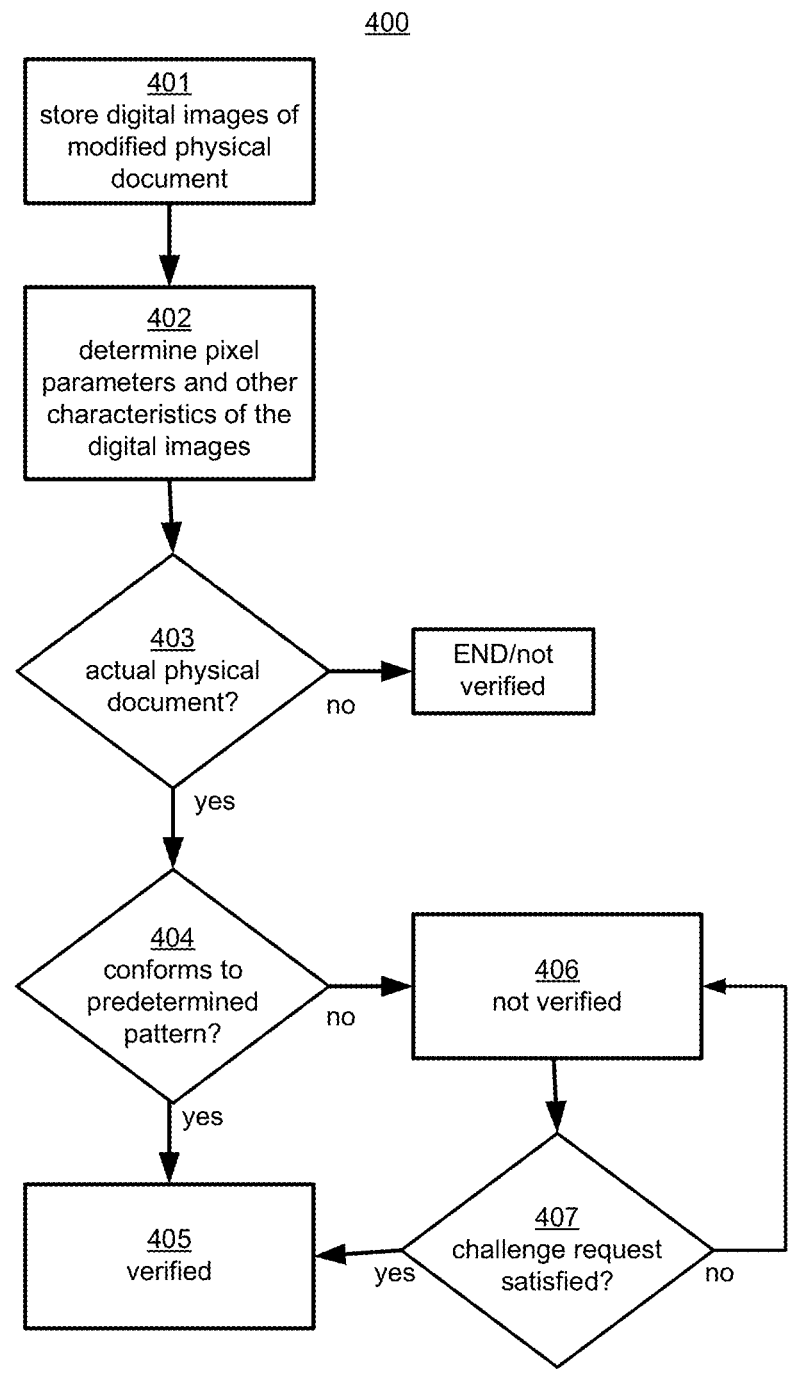
FIG. 4 illustrates a flow chart of a method for document verification, according to an example of the present disclosure.

FIG. 4 illustrates a flow chart of a method 400 for document verification. The method 400 is described by way of example with respect to the system 100 shown in FIG. 1. At 401, multiple digital images capturing the modified physical document 108 are stored. The digital images may be captured by the mobile device 106 or another device and stored. At 402, pixel parameters and other characteristics of the digital images are determined. The pixel parameters may be measured for particular regions of the modified physical document 108, such as for different pieces or for different areas of the pieces associated with edges or folds. The pixel parameters may include variations of pixel intensities that are detected for edge detection, fold line detection, etc.

At 403, the document verification application 110 determines, from the pixel parameters and other document characteristics determined from the captured digital images, whether the modified physical document captured in the plurality of digital images is an actual physical document or a digitally created representation of a modified physical document. For example, markings, serial numbers, color, etc., is checked. Detection of document thickness and shadows may be used to identify the document is real. If the document is determined not to be an actual physical document, the verification ends and notification may be generated that the document is considered not to be an actual physical document.

At 404, if the captured images are determined to be of an actual physical document, the document verification application 110 determines, from the pixel parameters and other document characteristics, whether the modified physical document 108 conforms to a predetermined pattern, such as a verification pattern of the verification patterns 122. If the modified physical document 108 conforms to the verification pattern, the document is verified at 405. For example, the document is verified as being destroyed, which may trigger other actions, such as crediting funds, completing a transaction, etc. Verification may include storing a flag indicating the document is verified, sending a notification to the enterprise server 224 that the document is verified to trigger other actions or send the verification to the computer 220 or another device or system.

At 406, the document is not verified. If the document is not verified, a challenge request may be generated and a determination is made as to whether the challenge request is satisfied at 407. The challenge request may include a randomly selected additional modification to the document. Satisfying the challenge request may include capturing additional images of the modified physical document 108 presumable after the additional modification(s) are made to the document as specified in the challenge request, and determining whether the document with the additional modifications conforms to the additional modification(s) as specified in the challenge request If the challenge request. If not, the document is considered as failing verification and notifications may be generated of the verification failure.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims and their equivalents in which all terms are meant in their broadest reasonable sense unless otherwise indicated.

What is claimed is:

1. A digital imaging and document verification system comprising:

imaging sensors to capture images of a modified physical document, the modified physical document being indicative of a physical document that is physically modified;

a data storage device to store the digital images of the modified physical document and modification guideline instructions for a user to modify physical documents by tearing, cutting, or folding; and a digital image processing circuit to:

measure pixel parameters of pixels of a plurality of regions of the stored digital images of the modified physical document, wherein the pixel parameters include variations of pixel intensities in at least one of the plurality of regions including tearing, cutting, or folding;

determine, from the measured pixel parameters of the stored digital images of the modified physical document, whether the modified physical document captured in digital images is an actual physical document or a fake document via the measured pixel parameters associated with tearing, cutting or folding;

determine, when the modified physical document is determined to be an actual physical document, from the measured pixel parameters of the stored digital images of the modified physical document, whether the modified physical document includes characteristics that conform to a predetermined verification pattern, the predetermined verification pattern indicative of the modified physical document being physically modified according to predetermined document modification guidelines, and the predetermined document modification guidelines comprising:

the modification guideline instructions that specify how to physically modify the physical document via tearing, cutting, or folding of the document; and verify the document if the modified physical document includes characteristics that conform to the predetermined verification pattern.

2. The system of claim 1, wherein the verification includes generating an indication that the modified physical document is destroyed.

3. The system of claim 1, wherein the predetermined verification pattern indicates the plurality of regions, locations of edges in each region, number of pieces of the modified physical document, and arrangement of the pieces, and the digital image processing circuit is to determine, from at least one of the plurality of digital images, pixel intensities of the pixels at areas of the plurality of regions corresponding to the locations of edges indicated in the predetermined verification pattern and characteristics of the modified physical document to determine whether the modified physical document conforms to the predetermined verification pattern.

4. The system of claim 3, wherein the digital image processing circuit is to determine, from the pixel intensities, whether the modified physical document includes edges in the areas.

5. The system of claim 4, wherein the digital image processing circuit is to determine whether the modified physical document includes torn edges and machine-made edges in the areas.

6. The system of claim 1, wherein the digital image processing circuit is to determine, from the pixel parameters, whether the modified physical document includes at least a plurality of markings, indicia, shapes, and colors in areas of at least one of the plurality of regions corresponding to the predetermined verification pattern.

7. The system of claim 6, wherein the determined markings or indicia include a serial number.

8. The system of claim 1, wherein the digital image processing circuit is to:

generate a challenge request to manipulate the modified physical document;

determine whether a digital image of the modified physical document is received responsive to the request; and in response to receiving the digital image, determine from the digital image, whether the modified physical document has been modified in accordance with the challenge request to verify the modified physical document.

9. A mobile device comprising:

a data storage storing digital images of a modified physical document, the modified physical document being indicative of a physical document that is physically modified;

imaging sensors to capture images of the modified physical document;

a display to display a modification guideline to modify the physical document to create the modified physical document;

a data storage device to store the digital images of the modified physical document and modification guideline instructions for a user to modify physical documents by tearing, cutting, or folding; and a document verification application executed by at least one processor to:

measure pixel parameters of pixels of a plurality of regions of the stored digital images of the modified physical document, wherein the pixel parameters include variations of pixel intensities in at least one of the plurality of regions including tearing, cutting, or folding;

determine, from the measured pixel parameters of the stored digital images of the modified physical document, whether the modified physical document captured in digital images is an actual physical document or a fake document via tearing, cutting or folding;

determine, when the modified physical document is determined to be an actual physical document, from the measured pixel parameters of the stored digital images of the modified physical document, whether the modified physical document conforms to a predetermined verification pattern, the predetermined verification pattern indicative of the modified physical document being physically modified according to predetermined document modification guidelines, and the predetermined document modification guidelines comprising:

the modification guideline instructions that specify how to physically modify the physical document via tearing, cutting, or folding of the document; and verify the modified physical document to determine if the modified physical document includes characteristics that conform to the predetermined verification pattern.

10. The mobile device of claim 9, comprising:

a network interface, wherein the document verification application sends an indication of verification of the modified physical document to a computer over a network via the network interface, wherein the computer performs an operation in response to receiving the verification.

11. The mobile device of claim 10, wherein the operation performed by the computer includes completion a transaction or crediting funds to an account.

12. The mobile device of claim 11, wherein the document verification application is to identify a serial number from at least one of the captured images, wherein the serial number is used to complete the transaction or to credit the funds.

13. A method comprising:

receiving at least a plurality of digital images capturing a modified physical document, the modified physical document being indicative of a physical document that is physically modified;

measuring pixel parameters of pixels in the plurality of digital images associated with a plurality of regions of the modified physical document, wherein the pixel parameters include variations of pixel intensities in at least one of the plurality of regions including tearing, cutting, or folding;

determining, from the measured pixel parameters of the plurality of digital images of the modified physical document, whether the modified physical document captured in digital images is an actual physical document or a fake document via tearing, cutting or folding;

determining, when the modified physical document is determined to be an actual physical document, from the measured pixel parameters of the plurality of digital images of the modified physical document, whether the modified physical document captured in the plurality of digital images is an actual physical document or a digitally created representation of a modified physical document; and in response to determining the modified physical document captured in the plurality of digital images is an actual physical document, determining, from the pixel parameters, whether the modified physical document conforms to a predetermined verification pattern, the predetermined verification pattern indicative of the modified physical document being physically modified according to predetermined document modification guidelines, and the predetermined document modification guidelines comprising:

the modification guideline instructions that specify how to physically modify the physical document via tearing, cutting, or folding of the document; and verify the modified physical document to determine if the modified physical document includes characteristics that conform to the predetermined verification pattern.

14. The method of claim 13, wherein the predetermined verification pattern indicates the plurality of regions and locations of edges in each region, and identifying pixel parameters comprises:

determining, from at least one of the plurality of digital images, pixel intensities of the pixels at areas of the plurality of regions corresponding to the locations of edges indicated in the predetermined verification pattern.

15. The method of claim 14, wherein determining whether the modified physical document conforms to a predetermined verification pattern comprises:

determining, from the pixel intensities, whether the modified physical document includes man-made edges and machine-made edges in the areas according to the predetermined verification pattern.

16. The method of claim 13, wherein determining whether the modified physical document conforms to a predetermined verification pattern comprises:

determining, from the pixel parameters, whether the modified physical document includes at least a plurality of markings, indicia, shapes, and colors in areas of at least one of the plurality of regions corresponding to the predetermined verification pattern; and detecting at least one of shadows and thickness of the modified physical document from the pixel parameters.

17. The method of claim 13, comprising:

generating a challenge request to manipulate the modified physical document;

determining whether a digital image of the modified physical document is received responsive to the request;

in response to receiving the digital image, determining from the digital image, whether the modified physical document has been modified in accordance with the challenge request.

18. The method of claim 17, wherein the challenge request is randomized.

19. The method of claim 13, comprising:

storing a plurality of different patterns for different types of documents;

determining a type of document for the modified physical document;

selecting one of the stored patterns according to the determined type, wherein the selected pattern is used as the predetermined verification pattern that is indicative the modified physical document was modified from an original physical version of the document according to predetermined guidelines.

20. A digital imaging and document verification system comprising:

imaging sensors to capture images of a modified physical document, the modified physical document being indicative of a physical document that is physically modified;

a data storage device to store the digital images of the modified physical document and modification guideline instructions for a user to modify physical documents by tearing, cutting, or folding; and a digital image processing circuit to:

measure pixel parameters of pixels of a plurality of regions of the stored digital images of the modified physical document, wherein the pixel parameters include variations of pixel intensities in at least one of the plurality of regions including tearing, cutting, or folding;

determine, from the measured pixel parameters of the stored digital images of the modified physical document, whether the modified physical document captured in the digital images is an actual physical document or a fake document via the measured pixel parameters associated with tearing, cutting or folding;

determine, when the modified physical document is determined to be an actual physical document, from the measured pixel parameters of the stored digital images of the modified physical document, whether the modified physical document includes characteristics that conform to a predetermined verification pattern, the predetermined verification pattern indicative of the modified physical document being physically modified according to predetermined document modification guidelines for at least one of:

folding the document, tearing the document, and capturing images of the torn document, and the predetermined document modification guidelines comprising instructions that specify how to physically modify the physical document via tearing, cutting, or folding of the document; and verify the document if the modified physical document includes characteristics that conform to the predetermined verification pattern, wherein the characteristics include at least one of tears, cuts, folds, depth, and thickness of the modified physical document.

* * * * *